No. 833,918.  
PATENTED OCT. 23, 1906.
R. C. CARPENTER.  
APPARATUS FOR PRODUCING CEMENT.  
APPLICATION FILED OCT. 17, 1902.
3 SHEETS—SHEET 1.
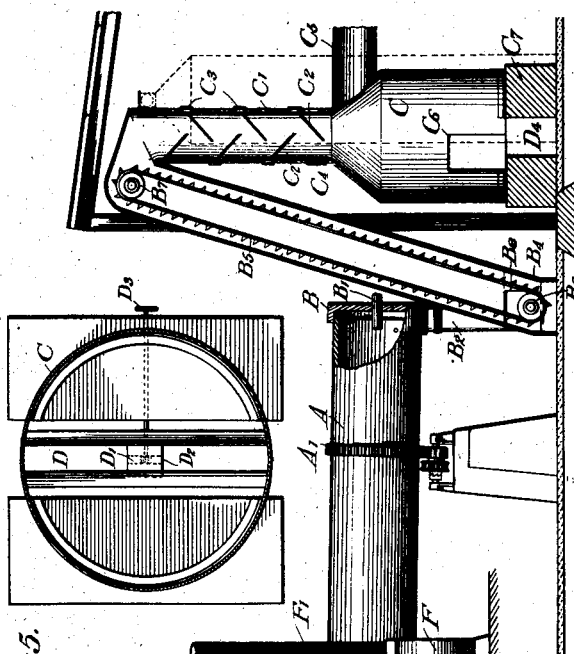
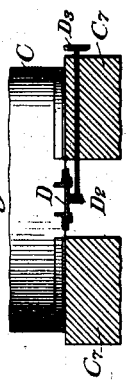
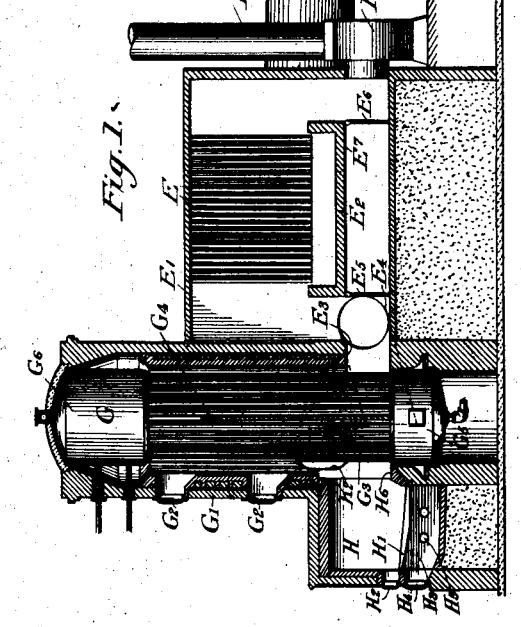
Witnesses:  
Inventor  
Rolla C. Carpenter  
By  
Duncan & Duncan Attys.

No. 833,918. PATENTED OCT. 23, 1906.
R. C. CARPENTER.
APPARATUS FOR PRODUCING CEMENT.
APPLICATION FILED OCT. 17, 1902.
3 SHEETS—SHEET 2.
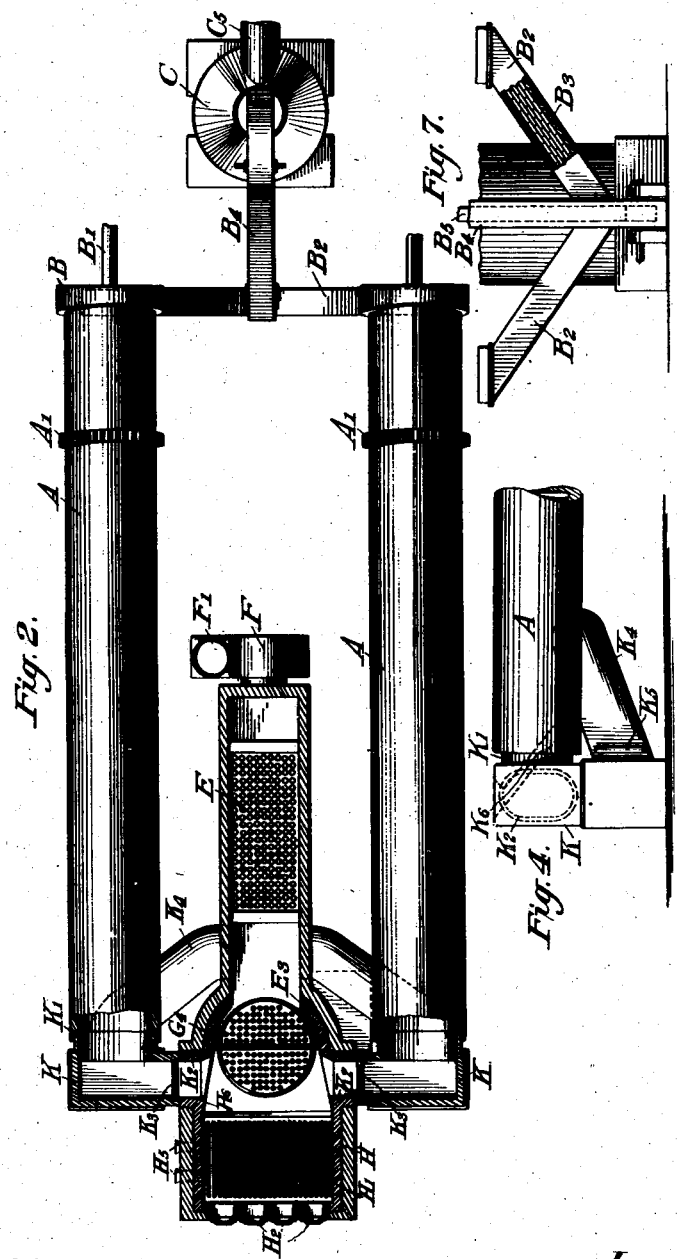
Witnesses:
Inventor:
Rolla C. Carpenter
By
Duncan & Duncan Attys.

No. 833,918. PATENTED OCT. 23, 1906.
R. C. CARPENTER.
APPARATUS FOR PRODUCING CEMENT.
APPLICATION FILED OCT. 17, 1902.
3 SHEETS—SHEET 3.
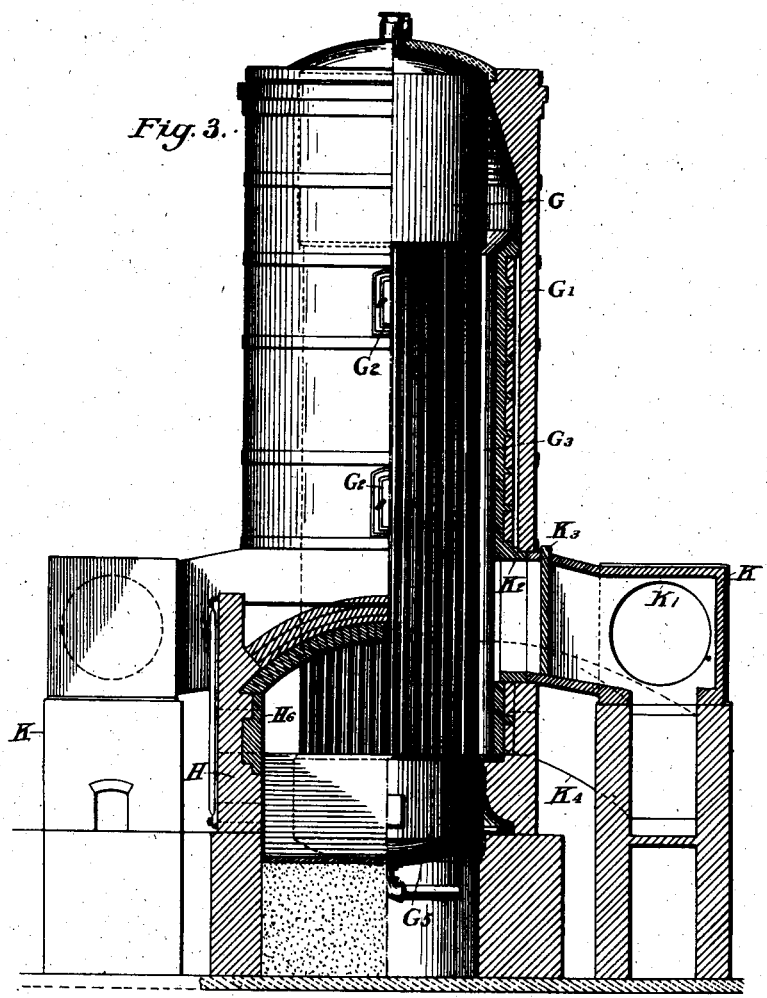

UNITED STATES PATENT OFFICE.

ROLLA C. CARPENTER, OF ITHACA, NEW YORK.

APPARATUS FOR PRODUCING CEMENT.

No. 833,918.　　　　Specification of Letters Patent.　　　Patented Oct. 23, 1906.

Application filed October 17, 1902. Serial No. 127,646.

*To all whom it may concern:*

Be it known that I, ROLLA C. CARPENTER, a citizen of the United States, and a resident of Ithaca, in the county of Tompkins, State of New York, have invented and discovered certain new and useful Improvements in Apparatus for Producing Cement, of which the following is a specification, taken in connection with the accompanying drawings, annexed to and forming part of the same.

This invention relates to apparatus for producing cement, and it especially relates to apparatus for producing it by the rotary process.

In the accompanying drawings, in which the same reference characters refer to similar parts in the various figures, Figure 1 is an elevation, partly in section, of apparatus embodying my invention. Fig. 2 is a plan view of the same, parts being shown in section. Fig. 3 is a vertical sectional view of the boiler and mountings forming part of the same. Figs. 4, 5, 6, and 7 show details.

The embodiment of this invention shown in the drawings comprises the two rotary kilns A of ordinary construction and mounted in the usual way at a slight incline, so as to be rotated by the ordinary driving means, (indicated at $A_1$.) These kilns are closely engaged by the chambers B about the mouths of the same, as shown in Fig. 1, so that a substantially tight joint is made at this point, while at the same time the kilns are allowed to rotate freely. The kilns are heated in any desired way, preferably by jets of powdered fuel, oil, or gas issuing from the burner-tubes $B_1$. The chute $B_2$ is connected with the lower portion of each one of the chambers B, and this chute, as indicated in Fig. 7, may be lined with suitable refractory material $B_3$. The cement clinker which is discharged from the mouth of the kiln is guided down this chute and falls into the clinker-pit at the lower end of the conveyer-case $B_4$. The conveyer $B_5$, as it is indicated in the drawings, is composed of an endless chain with buckets formed in the usual way, and this chain is mounted upon the sprocket-wheels $B_6$ $B_7$ at either end of the conveyer-case. This conveyer is operated by rotating one of the sprocket-wheels $B_7$ at any desired rate, and this sprocket-wheel is arranged so that the material carried up by the conveyer is delivered into the upper end of the tower $C_1$, which, as indicated in Fig. 1, is connected to the upper end of the clinker-cooler C. This tower $C_1$ is formed with a number of inclined slides $C_2$ projecting from either side of the same so as to form a staggered passage. The cement clinker delivered into the top of this staggered tower falls from one of these slides to another, so that it comes into contact with the air in the tower to a very considerable extent during its fall, and thus imparts its heat to this air and to the slides over which it passes. The air to support the combustion of the fuel within the kiln is preferably forced by a fan or other means through the air-pipe $C_5$ and passes into the top of the cooler adjacent the tower. This air, which moves in a reverse direction to the cement clinker, passes through the tower, the conveyer-case, and chutes and absorbs heat, so that it enters the kiln in a highly-heated condition.

The clinker accumulates in the cooler C, which rests upon suitable piers $C_7$ and is removed from time to time by opening the discharge-slide D. (Indicated in Figs. 5 and 6.) This slide is preferably mounted in suitable guideways in the bottom of the cooler and is reciprocated by the gear $D_2$, which engages a rack $D_1$ on the central portion of the slide. This gear is operated by the handle $D_3$, and by this means the slide D may be moved to discharge the clinker at either end of the cooler, so that the cement falls into receptacles in the passage $D_4$ under the cooler. If desired, however, any other means of removing the clinker from the cooler may be used. The cleaning-door $C_6$ is formed in the side of the cooler, but is kept closed during the normal operation of the apparatus. A number of openings $C_3$ may be formed adjacent each of the slides $C_2$ and serve to clean these slides when desired, and similar openings $C_4$ are formed near the lower portion of the tower to admit additional air if necessary. These openings can be closed by suitable doors when desired. Instead of the particular construction of clinker-cooler and conveying means which has been disclosed other forms of clinker-cooler may be used, although it is desirable in all cases that these clinker-coolers shall be so constructed that the air for combustion shall be heated before it enters the kilns.

The upper ends of the kilns are each preferably connected with hoods or settling-chambers in which a considerable portion of the suspended solid matter or dust in the kiln-gases is deposited, so that this material does not interfere with the operation of the apparatus through which these gases subsequently pass and from which it may be removed from time to time as desired. Each of the hoods K is formed with an extension $K_1$, which makes a substantially tight joint with the upper end of the kiln in any desired way, while allowing the rotation of the kiln. The boiler-flue $K_2$ communicates with the upper portion of the hood, and the boiler-damper $K_3$ operates in this passage to adjust the extent of the opening or to entirely close the same, if desired. The economizer-flue $K_4$ communicates with the lower portion of the hood and connects with the economizer-housing, opening at the point $E_4$. This economizer-flue is controlled by a similar economizer-damper $K_5$. The hood is provided with the usual conduit $K_6$, by which cement material is fed into the upper end of the kiln.

The boiler G, through which the gases from the kiln may pass, if desired, is mounted in a suitable boiler-setting $G_1$. This boiler is preferably an upright tubular boiler formed with widely-spaced vertical water-tubes $G_3$, so as to readily allow for cleaning the same. The division-plate $G_4$ is arranged across the boiler to cause the gases to pass through the tubes in the proper manner, the gases passing up over the top of this division-plate. The boiler is formed, as indicated, with the water-drum $G_5$ and with the steam-drum $G_6$ at the top of the boiler. It will, however, be understood that it is not necessary in all cases to use the particular description of boiler which has been illustrated and described, since other forms of water-tube boiler could be used, and indeed under some circumstances fire-tube boilers might be employed. The boiler-setting is preferably formed with several cleaning-doors $G_2$ in the front face, and the furnace H is mounted to coöperate with the boiler in the usual way. This furnace comprises the grate $H_1$, the ash-pit $H_3$, of ordinary construction, being formed as indicated in Fig. 1, and suitable doors $H_2$ $H_4$ being provided in the front of the furnace. A series of blast-holes $H_5$ are indicated, through which forced draft may be supplied to the ash-pit, if desired. This auxiliary furnace may be used in supplying additional heat to the boiler or if for any reason it is desirable to operate the boiler when the kilns are not regularly operated. In such a case the hot gases from the combustion of suitable fuel on the grate $H_1$ pass through the throat $H_6$ of the furnace and heat the boiler in a well-known manner. Since the boiler-flue through which the kiln-gases enter the boiler is located beyond the bridge-wall $H_6$, the burning of fuel in the inclosed combustion-chamber of the auxiliary furnace is not interfered with in any way by the presence of the spent gases from the kiln.

Another heat-utilizing device may be employed, if desired, to absorb the heat from the kiln-gases and to utilize the same, preferably for the production of heated water or steam. This heat-utilizing device, which may be used in connection with the boiler or otherwise, preferably consists of the feed-water heater or economizer indicated in the drawings. The economizer E is shown mounted in a suitable housing $E_1$, and this economizer is formed in the ordinary way of vertical tubes, these tubes being widely spaced for facility of cleaning. Below the series of tubes is a soot-chamber $E_2$, which may be cleaned from time to time through suitable openings formed in the housing. The hot gases from the boiler may enter the economizer-housing through the passages $E_3$ and when the economizer is operating normally pass between the economizer-tubes to heat the water circulating therein and then are drawn into the fan F and are discharged from the stack $F_1$. It will be noted that the by-pass $E_7$ is formed under the soot-chamber, and this by-pass is controlled by the two pivoted dampers $E_5$ $E_6$, which in the position indicated in Fig. 1 close this by-pass. It will be evident, however, that when these dampers are both swung into horizontal position the by-pass is open and the passage through the economizer-tubes is closed. This allows the gases to pass directly from the passage $E_3$ into the fan and stack.

It will be seen, therefore, that the gases issuing from the kiln pass into the hood K. Then under normal conditions when it is desired that these gases pass through the boiler and economizer before reaching the stack the boiler-damper $K_3$ is opened, so as to allow these gases to pass through the boiler-flue $K_2$, then through the boiler, heating the tubes, as has been described, and then these gases pass through the economizer, the fan being operated to the extent required to produce the desired circulation of gases through the apparatus. If desired, this circulation may be aided by supplying the air to the pipe $C_5$ under pressure. A large part of the heat in the kiln-gases is utilized before they are discharged into the stack, and a very great saving results by this apparatus. If it is desired to operate the boiler by the kiln-gases without utilizing the economizer, the by-pass dampers $E_5$ $E_6$ are operated, as has been described, and the kiln-gases then enter the by-pass and go directly into the stack. It is possible, however, to allow the kiln-gases to pass through the economizer without passing through the boiler, and in order to accomplish this the damper $K_3$ in the hood is closed to close the boiler-flue $K_2$. The economizer-damper $K^5$ is opened, and the kiln-gases thereupon enter the economizer-housing through the opening $E_4$. The kiln-gases may be utilized in this way in the economizer, or, if desired, the by-pass may be opened, and these gases may pass at once into the stack. It will be understood also that by partially opening the by-pass dampers $E_5$ $E_6$ part of the gases may be allowed to pass through the economizer-tubes and part through the by-pass, so that the amount of heat utilized in the economizer may be regulated as desired. The auxiliary furnace H may be used under any conditions to heat the boiler either when the kiln-gases are not used for this purpose or in conjunction with the kiln-gases, and suitable blast is supplied when desired through the blast-holes $H_5$, although under most conditions the exhaust-fan F effects the proper circulation of air through this part of the apparatus.

It will of course be understood by those familiar with this art that many modifications may be made from the exact form of apparatus which has been disclosed. It is not necessary in all cases to employ all of the elements which have been described, and, furthermore, parts of this apparatus may be used in connection with other elements without departing from the spirit of this invention. I do not, therefore, wish to be limited by the disclosure which I have made in this case; but

What I claim as new, and what I desire to secure by Letters Patent, is set forth in the annexed claims:

1. In cement apparatus, rotary kilns, chambers inclosing the mouths of said kilns, means to heat said kilns, a cooler mounted adjacent said kilns, hoods connected with the upper ends of said kilns, an upright water-tube boiler having widely-spaced vertical tubes mounted adjacent said hoods, an auxiliary furnace for said boiler, an economizer mounted adjacent said boiler and provided with a by-pass and by-pass dampers, boiler-flues and economizer-flues provided with dampers connected with said boiler and said economizer and an exhaust-fan and stack connected with said economizer.

2. In cement apparatus, a cement-kiln, a clinker-chute to receive clinker from said kiln, a clinker-cooler adjacent said kiln, means to supply air to said clinker-cooler, an inclosed conveyer to convey clinker from said chute to said cooler to heat the air for combustion in said kiln, a vertical water-tube boiler and an economizer mounted adjacent said kiln, said boiler being provided with an auxiliary furnace and connections between said kiln and said boiler and economizer to operate said boiler and economizer by the kiln-gases.

3. In cement apparatus, a rotary kiln, means to heat said kiln, inclosed means to convey clinker from said kiln and to cool the same, an air-pipe to supply the air for combustion in said kiln to said means to heat said air by said clinker as it passes to said kiln, a hood at the upper end of said kiln, a vertical water-tube boiler and an economizer mounted adjacent said hood and connections to pass the kiln-gases from said hood through said boiler and economizer.

4. In cement apparatus, a rotary kiln, means to heat said kiln, a hood connected with the upper end of said kiln to receive the kiln-gases, a vertical water-tube boiler having widely-spaced tubes and provided with an auxiliary furnace mounted adjacent said hood, said furnace being adapted to be operated by forced draft, an economizer provided with a valved by-pass mounted adjacent said boiler, an exhaust-fan connected with said economizer and a valved boiler-flue and economizer-flue connecting said hood with said boiler and economizer.

5. In cement apparatus, a rotary cement-kiln, means to heat said kiln, a hood connected with the upper end of said kiln, a vertical water-tube boiler having widely-spaced vertical tubes mounted adjacent said hood, an auxiliary furnace for said boiler comprising a grate, an inclosed fire-box, an ash-pit and means for supplying forced draft to said ash-pit and valved flues connected with said hood to supply kiln-gases to said boiler and to conduct said kiln-gases past said boiler without operating the same.

6. In cement apparatus, a rotary kiln, means to feed material into said kiln, means to heat said kiln, a boiler mounted adjacent said kiln, an auxiliary furnace for said boiler provided with an inclosed combustion-chamber and passages to feed the spent gases from said kiln to said boiler beyond the combustion-chamber of the same.

7. In cement apparatus, a rotary kiln, means to heat said kiln, a hood connected to the upper end of said kiln, a vertical water-tube boiler having widely-spaced vertical tubes mounted adjacent said kiln and means to conduct the gases from said kiln through said hood to said boiler.

8. In cement apparatus, a rotary kiln, means to heat said kiln, a hood connected to the upper end of said kiln, a water-tube boiler mounted adjacent said hood and means to convey the kiln-gases from said hood through said boiler.

9. In cement apparatus, a rotary kiln, means to heat said kiln, a hood connected to the upper end of said kiln, a boiler and an economizer mounted adjacent said hood and means to conduct the kiln-gases from said hood through said boiler and said economizer.

10. In cement apparatus, a kiln, means to heat said kiln, a hood connected to the upper end of said kiln, a boiler and economizer mounted adjacent said hood, by-passes for the same and means to conduct the kiln-gases from said hood through said boiler and economizer.

11. In cement apparatus, a kiln, means to heat said kiln, a hood connected with the upper end of said kiln, a boiler and economizer mounted adjacent said hood and means to conduct the kiln-gases from said hood through said boiler and economizer.

12. In cement apparatus, a kiln, means to heat said kiln, a hood connected with the upper end of said kiln, a boiler and economizer provided with by-passes mounted adjacent said hood, means to conduct the kiln-gases from said hood through said boiler and economizer and a fan to regulate the movement of said gases.

13. In cement apparatus, a kiln. means to heat said kiln, a hood connected with the upper end of said kiln, a boiler and economizer mounted adjacent said hood, means to conduct the kiln-gases from said hood through said boiler and economizer and a fan to regulate the movement of said kiln-gases.

14. In cement apparatus, a kiln, means to heat said kiln, a hood connected to the upper end of said kiln, an economizer provided with a by-pass mounted adjacent said hood and means to conduct the kiln-gases from said hood through said economizer.

15. In cement apparatus, a rotary kiln, means to heat said kiln, a water-tube boiler provided with a by-pass mounted adjacent said kiln and means to conduct the kiln-gases through said boiler.

16. In cement apparatus, a rotary kiln, means to heat said kiln, an economizer provided with a by-pass mounted adjacent said kiln and means to conduct the kiln-gases through said economizer.

17. In cement apparatus, a kiln, means to heat said kiln, an economizer mounted adjacent said kiln, means to conduct the kiln-gases through said economizer and a fan to regulate the movement of said gases.

18. In cement apparatus, a rotary kiln, means to heat said kiln, a hood connected with the end of said kiln, a boiler and means to conduct the kiln-gases from said hood through said boiler.

19. In cement apparatus, a rotary kiln, means to heat said kiln, a hood connected to the end of said kiln, a boiler provided with a by-pass mounted adjacent said hood and means to conduct the kiln-gases from said hood through said boiler.

20. In cement apparatus, a rotary kiln, means to heat said kiln, a water-tube boiler and an economizer mounted adjacent said kiln and means to conduct the kiln-gases through said boiler and economizer.

21. In cement apparatus, a kiln, means to heat said kiln, a boiler and economizer mounted adjacent said kiln and means to conduct the kiln-gases through said boiler and economizer.

22. In cement apparatus, a kiln, means to heat said kiln, an economizer mounted adjacent said kiln, means to conduct the kiln-gases through said economizer and means to regulate the movement of said kiln-gases.

23. In cement apparatus, a rotary kiln, means to heat said kiln, a boiler provided with a by-pass mounted adjacent said kiln and means to conduct kiln-gases through said boiler.

24. In apparatus for burning cement, a rotary kiln, means to heat said kiln, a boiler adjacent said kiln and means to conduct kiln-gases through said boiler.

25. In cement apparatus, a rotary kiln, means to heat said kiln, a water-tube boiler mounted adjacent said kiln and means to conduct kiln-gases through said boiler.

26. In cement apparatus, a rotary kiln, means to heat said kiln, a hood connected to the end of said kiln, a boiler provided with a by-pass mounted adjacent said hood and connected thereto, and a fan to regulate the movement of gases through said kiln and said boiler.

27. In cement apparatus, a rotary kiln, means to heat said kiln, a boiler provided with a by-pass adjacent said kiln, means to conduct kiln-gases to said boiler, and a fan to regulate the movement of gases through said kiln and said boiler.

28. In cement apparatus, a rotary kiln, means to heat said kiln, a water-tube boiler provided with a by-pass adjacent said kiln, means to conduct kiln-gases through said boiler and a fan to regulate the movement of said gases.

29. In cement apparatus, a rotary kiln, means to heat said kiln, a boiler connected to said kiln to receive the kiln-gases, an economizer to receive the kiln-gases from said boiler, and a fan to regulate the movement of the kiln-gases.

30. In cement apparatus, a rotary kiln, means to heat said kiln, a boiler provided with a by-pass adjacent said kiln to receive the kiln-gases, an economizer mounted adjacent said boiler to receive the kiln-gases therefrom, and a fan to regulate the movement of the kiln-gases.

31. In cement apparatus, a rotary kiln, means to heat said kiln, a vertical water-tube boiler adjacent said kiln to receive the kiln-gases, an economizer adjacent said boiler to receive the kiln-gases therefrom, and a fan to regulate the movement of the kiln-gases.

32. In cement apparatus, a rotary kiln, means to heat said kiln, a water-tube boiler mounted adjacent said kiln to receive the kiln-gases, an economizer adjacent said boiler to receive the kiln-gases therefrom and a fan beyond said economizer to regulate the movement of the kiln-gases.

ROLLA C. CARPENTER.

Witnesses:
MARGARET I. COLQUHOUN,
RICHARD G. DUKES.